United States Patent [19]

Schuessler

[11] 4,077,815
[45] Mar. 7, 1978

[54] WATER SOLUBLE FLUX

[75] Inventor: Philipp William Hans Schuessler, Endwell, N.Y.

[73] Assignee: International Business Machines Corporation, Armonk, N.Y.

[21] Appl. No.: 752,337

[22] Filed: Dec. 20, 1976

[51] Int. Cl.² .............................................. B23K 35/34
[52] U.S. Cl. ........................................ 148/23; 148/24
[58] Field of Search ............................. 148/23, 24, 26

[56] References Cited

U.S. PATENT DOCUMENTS

| | | | |
|---|---|---|---|
| 3,436,278 | 4/1969 | Poliak | 148/23 |
| 3,589,952 | 6/1971 | Burne | 148/24 |
| 3,597,285 | 8/1971 | Aronberg | 148/26 |
| 3,755,886 | 9/1973 | Hermann | 148/23 |
| 3,791,879 | 2/1974 | Goldfarb | 148/23 |
| 3,832,242 | 4/1974 | Cuthbert | 148/24 |
| 3,865,641 | 2/1975 | Aronberg | 148/23 |

OTHER PUBLICATIONS

Knapp et al., "Water Soluble Flux," IBM Technical Disclosure Bulletin, vol. 18, No. 12, May, 1976.

*Primary Examiner*—Peter D. Rosenberg
*Attorney, Agent, or Firm*—David M. Bunnell

[57] ABSTRACT

A water soluble flux composition includes a vehicle portion of polyoxyethylene-polyoxypropylene block copolymers and their adducts of trimethylolpropane along with an activator portion of tetrakis hydroxyalkyl derivatives of alkalene diamines such as N,N,N',N'-tetrakis (2-hydroxypropyl) ethylenediamine and/or a long chain alkyldiethanolamine, such as polyoxyethylene soyamine.

6 Claims, No Drawings

WATER SOLUBLE FLUX

The invention herein described was made in the course of or under a contract or subcontract (or grant) with the Department of the Navy.

BACKGROUND OF THE INVENTION

This invention relates generally to water soluble flux compositions and more specifically to water soluble flux compositions employing polyoxyalkylene polymer vehicles which leave no residue and which are particularly suitable for processes employed in making lead-tin solder joints in integrated circuit manufacture.

Normally, large scale solder operations in the electronics industry use rosin fluxes which function to clean metal surfaces of oxides and other contaminates before soldering. Chlorinated hydrocarbon cleaning solutions are used with these fluxes which require special precautions in handling and in the disposal of spent material. Also, residues of chlorinated hydrocarbon solvents on integrated circuit structures can cause corrosion if they are not completely removed.

Water soluble fluxes have been developed to permit removal of the flux after the soldering operation with water. Such fluxes have included polyoxyethylene glycol containing materials such as are described, for example, in IBM Technical Disclosure Bulletin, Vol. 18, No. 12, May 1976, page 3988, or mixtures of polyethylene and polypropylene glycols or low molecular weight polyoxyethylene ethers along with alkyl alcohols and glutamic acid hydrochloride such as are described in U.S. Pat. No. 3,436,278.

Water soluble flux compositions have now been found which are superior to known water soluble fluxes particularly with respect to flux residue removal, viscosity control, tack quality, and the strength of solder joints obtained in integrated circuit chip joining operations.

BRIEF SUMMARY OF THE INVENTION

In accordance with this invention there is provided a fluxing composition which includes a vehicle portion of block copolymers of polyoxyethylene and polyoxypropylene and/or trimethylolpropane derivatives thereof, along with an activator portion of tetrakis hydroxyalkyl derivatives of alkylene diamines such as N,N,N', N'-tetrakis (2-hydroxypropyl) ethylenediamine and/or long chain alkyldiethanolamines where the alkyl group contains from about 12 to 18 carbon atoms such as polyoxyethylene soyamine. The vehicle portion of the composition constitutes about 90 to 99.5% by weight of composition and the activator portion of from about 0.5 to 10% by weight of composition.

DETAILED DESCRIPTION

The vehicles of the flux of the invention provide the correct flow characteristics for the flux material and act as an oxidation barrier blanket to protect the metal during the soldering process. The vehicles also provide some cleaning and fluxing action. The vehicles of the flux of the invention are certain water soluble, polyoxyalkylene ether block copolymers. Suitable polyoxyalkylene ethers are polyethylene oxide-polypropylene oxide block copolymers and derivatives thereof with trimethylolpropane. Such materials are marketed, for example, under the tradenames Pluronic L44, L72 and L121 and Pluracol V7 and V10 (trimethylolpropane derivatives) by the BASF Wyandotte Corporation. The preparation of such materials is described, for example, in U.S. Pat. No. 2,674,619. A formula for the polyoxyethylene polyoxypropylene oxide block copolymers, would be for example;

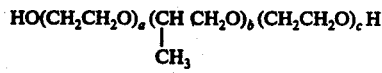

where $a$, $b$ and $c$ are integers whose values vary with the molecular weight of the particular polymer. The molecular weight is selected for any given application to provide the desired flux viscosity. These block copolymers can be prepared by the controlled addition of propylene oxide to the hydroxyl groups of a propylene glycol nucleus. The resulting hydrophobe is tailored to any desired length varying from about 800 to several thousand in molecular weight. Ethylene oxide is then added which sandwiches the hydrophobic portion of the molecule between poly(oxyethylene) groups. For example, the Pluronic L-44 polymer is a liquid which has a molecular weight of about 12,000 for the poly(oxypropylene) portion and has about a 40% by weight ethylene oxide content. The L72 polyol has a molecular weight of about 2050 for the polyoxypropylene portion and has about a 20 percent by weight ethylene oxide content. The L121 polyol has a molecular weight of about 4,000 for the poly (oxypropylene) portion and has about a 10% by weight ethylene oxide content. The polymers are chosen so that the flux has the desired viscosity characteristics. For example, in an integrated circuit chip bonding process the vehicle portion provides the viscosity or tack needed to retain the integrated circuit chip in its proper place on the substrate before and during solder reflow. Preferred viscosities for this purpose have been found to be in the range of from about 15,000 to 20,000 centistokes at room temperature (23° C). The vehicle portion of the flux composition comprises from about 90 to 99.5% by weight of the composition. It is preferred to use a mixture of high and low viscosity polymers in order to give an easily tailored viscosity simply by varying the proportions of each polymer.

Although the reason is not exactly known, the vehicles of the flux of the invention are stable at the soldering temperatures and do not condense at the soldering temperatures to form insoluble film residues as do, for example, polyoxyethylene glycols. These residues are believed to be condensation products which are not water soluble and which bridge between contacts to lower the resistance value to a point where cross-talk between circuits can occur, for example a lowering from $10^{12}$ to $10^9$ ohms. Because the residues tend to hydrolyze during the life time of the devices, the resistance values would drop even further.

Although the vehicles themselves have been found to have a fluxing and cleaning action they do not sufficiently wet the metallurgy by themselves so that an activator portion is employed in amounts of from about 0.5 to 10% by weight of flux composition. One type of suitable activator are tetrakis hydroxy alkyl derivatives of alkylenediamines such as N,N,N',N'-tetrakis (2-hydroxypropyl) ethylenediamine. Another suitable class of amine activators are long chain alkyldiethanolamines where the alkyl group contains about 12 to 18 carbon atoms such as polyoxyethylene soyamine, and amines where the source of the alkyl radical is oleic, stearic, tallow or coco fatty acids. A general formula for tertiary amine materials is as follows;

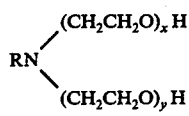

where R is an alkyl group having 12 to 18 carbon atoms and $x$ and $y$ are integers denoting the ethylene oxide chain length. Although either class of activators can be employed separately, it is preferred to use a mixture of the two.

In the compositions of the invention it is not necessary to use a volatile solvent in the flux so that the problem of gas pressure, which could displace parts to be joined during the soldering process, is avoided.

The invention is further illustrated by, but is not intended to be limited to the following examples wherein parts are parts by weight unless otherwise indicated.

EXAMPLE 1

A flux composition is prepared by blending the following ingredients until a homogeneous system is obtained.

|  | Parts by Weight |
|---|---|
| Polyoxyethylene-polyoxypropylene block copolymer derivative of trimethylolpropane, viscosity at 100° F 1,200 CST (ASTM D445-537) (Pluracol V-7 BASF Wyandotte) | 49.0 |
| Polyoxyethylene-polyoxypropylene block copolymer derivative of trimethylolpropane viscosity at 100° F 45,000 CST (ASTM D445-53T) (Pluracol V-10 BASF Wyandotte Corp.) | 49.0 |
| Polyoxyethylene (10) soyamine (Ethomeen S/20 Armak Chemicals Division) where 10 designates moles of ethylene oxide. | 0.75 |
| N,N,N',N'-tetrakis (2-hydroxypropyl) ethylenediamine (Quadrol, BASF Wyandotte Corp.) | 0.25 |

After mixing, the formula was allowed to stand overnight to permit the evolution of trapped air bubbles and then it was stored in a tightly capped bottle to avoid possible moisture absorption. The flux composition was coated on metallurgy to be joined in a thin film either by manually brushing with an artist brush No. 1 or by an automatic machine dispenser. In the latter case no undesirable stringers or legs occurred in dispensing the flux composition. The flux was used to join semiconductor chips to substrates with lead tin solder joints in which the structure was heated to about 350° C during the process. After bonding, the flux was removed by a deionized water jet spray and the structures were dried. Bond strengths were determined on 20 samples by an Instron tensile pull test in which a metal stud is attached to the chips and the chip is pulled from the substrate. The average bond strength was 5.28 pounds/chip with a range of 4.0 to 6.35. When the process was repeated using a standard rosin and benzyl alcohol flux mixture, the average strength was 4.6 pounds/chip with a range of the samples tested of 3.8 to 5.5.

The underlying metallurgy was examined after pulling the chips and no flux residue was observed using the flux of the invention. When the process was repeated using a polyoxyethylene glycol vehicle an examination showed flux residue spiders between the metal contacts which was a film of insoluble material. Temperature cycling of such modules will cause electrical opens as the solder joints are broken due to a mismatch of expansion coefficients. This has been observed for other organics trapped beneath a chip.

EXAMPLE 2

Other flux formulations are as follows:

| | Formulation Parts By Weight | | | | | | | | | | |
|---|---|---|---|---|---|---|---|---|---|---|---|
| | 1 | 2 | 3 | 4 | 5 | 6 | 7 | 8 | 9 | 10 | 11 |
| Polyoxyethylene-polyoxypropylene block copolymer derivative of trimethylolpropane viscosity at 100° F 1,200 CST (Pluracol V-7 BASF Wyandotte) | 49 | 49 | 49 | 49 | 49 | 29.9 | 49 | 38 | — | — | — |
| Polyoxyethylene-polyoxypropylene block copolymer derivative of trimethylolpropane viscosity at 100° F 45,000 CST (ASTM D445-53T) (Pluracol V-10 BASF Wyandotte Corporation) | 50 | 50 | 50 | 49 | 49 | 60.7 | 50 | 61 | 50 | 50 | 50 |
| Polyoxyethylene (10) soyamine (Ethomeen S/20 Armak Industrial Chem. Division) | .5 | .25 | — | 2 | 1 | 4.7 | .75 | .75 | 1 | 1 | 1 |
| N,N,N',N'-tetrakis (2-hydroxypropyl) ethylenediamine (Quadrol BASF Wyandotte Corporation) | .5 | .75 | 1 | — | 1 | 4.7 | .25 | .25 | 1 | 1 | 1 |
| Polyoxyethylene-polyoxypropylene block copolymer (Pluronic 44 polyol BASF Wyandotte Corp.) | — | — | — | — | — | — | — | — | 48 | — | — |
| Polyoxyethylene polyoxypropylene block copolymer (Pluronic 72 polyol BASF Wyandotte Corp.) | — | — | — | — | — | — | — | — | — | 48 | — |
| Polyoxyethylene polyoxypropylene block copolymer (Pluronic 121 polyol BASF Wyandotte Corp.) | — | — | — | — | — | — | — | — | — | — | 48 |

The formulations were prepared and used as described in Example 1 with satisfactory results.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A water soluble fluxing composition which comprises:

from about 90 to 99.5 percent by weight of composition of a vehicle portion consisting essentially of block copolymers of polyoxyethylene and polyoxypropylene and trimethylol derivatives thereof, and from about 0.5 to 10 percent by weight of composition of an activator portion selected from the group consisting of tetrakis hydroxyalkyl derivatives of alkylene diamines, long chain alkyldiethyanolamines where the alkyl group contains from about 12 to 18 carbon atoms, and mixtures thereof.

2. The fluxing composition of claim 1 in which the vehicle is a mixture of two water soluble polyoxyethylene-polyoxypropylene block copolymer derivatives of trimethylolpropane having different viscosities, in proportions such that said composition has a viscosity in the range of from about 15,000 to 20,000 CST at a temperature of about 23° C.

3. The fluxing composition of claim 1 in which the activator is a mixture of N,N,N',N'-tetrakis (2-hydroxypropyl) ethylene diamine and a long chain alkyldiethanolamine where the alkyl group contains about 12 to 18 carbon atoms.

4. The fluxing composition of claim 3 in which the activator is a mixture of N,N,N',N'-tetrakis (2-hydroxypropyl) ethylene diamine and polyoxyethylene soyamine.

5. The fluxing composition of claim 1 wherein the composition contains about 98 to 99.5 parts of vehicle portion and about 0.5 to 2 parts of activator portion.

6. The fluxing composition of claim 1 wherein the vehicle portion is a mixture of a polyoxyethylene-polyoxypropylene block copolymer and a polyoxyethylene-polyoxypropylene block copolymer derivative of trimethylol propane.

* * * * *